J. F. PETERS.
POLYPHASE REACTANCE COIL.
APPLICATION FILED APR. 5, 1917.
1,253,275.
Patented Jan. 15, 1918.
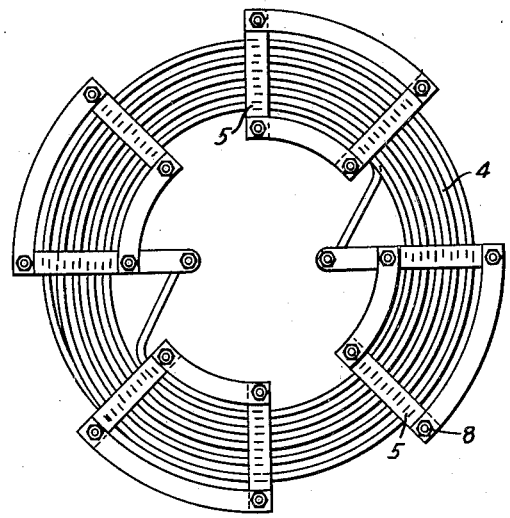
Fig. 2.
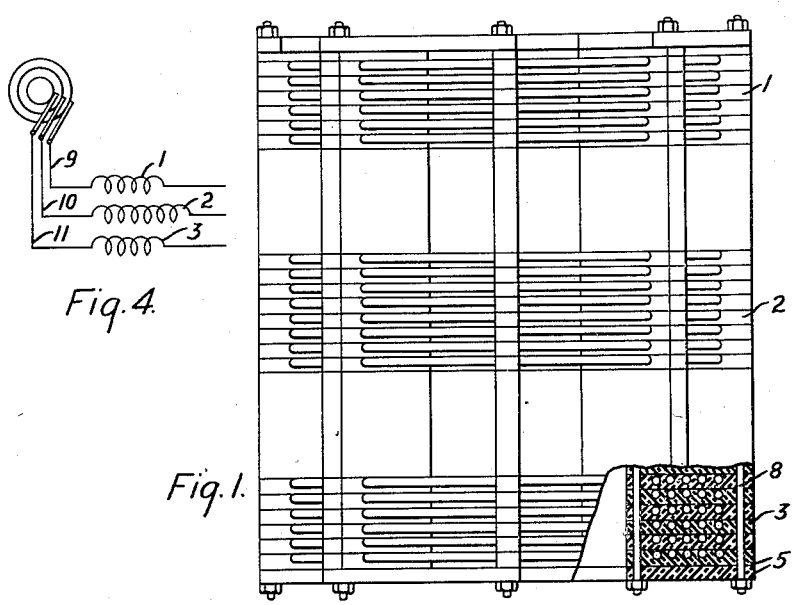
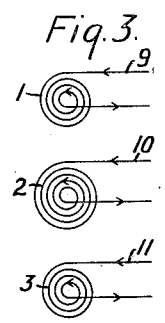
Fig. 3.
Fig. 4.
Fig. 1.
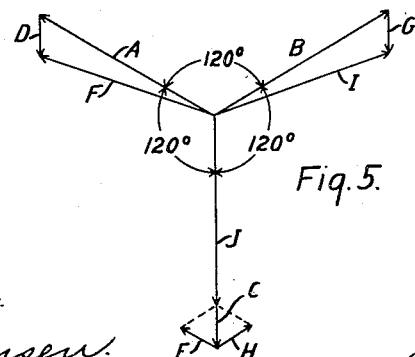
Fig. 5.
WITNESSES:
Fred. A. Lind.
Geo. W. Hansen.
INVENTOR
John F. Peters
BY
Wesley G. Carr
ATTORNEY

UNITED STATES PATENT OFFICE.

JOHN F. PETERS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

POLYPHASE REACTANCE-COIL.

1,253,275.      Specification of Letters Patent.      Patented Jan. 15, 1918.

Application filed April 5, 1917. Serial No. 160,057.

*To all whom it may concern:*

Be it known that I, JOHN F. PETERS, a citizen of the United States, and a resident of Edgewood Park, in the county of Allegheny and State of Pennsylvania, have invented a new and useful Improvement in Polyphase Reactance-Coils, of which the following is a specification.

My invention relates to current-limiting devices and it has special reference to reactance coils that are adapted to be inserted in polyphase circuits in order to limit, to a safe value, such current flow as may be occasioned by short circuits or any other unusual current-increasing conditions.

Heretofore, in polyphase power-distributing systems and particularly in three-phase systems, it has been customary to insert single-unit reactance coils in the respective conductors or phases of such systems. These separate coils were spaced apart and grouped either in an equilateral formation or in a straight line in order to minimize and balance the mutual inductive effects between the coils during the times that any one or all of them were subjected to the flow of short-circuit currents. Inasmuch as each coil, by itself, was depended upon to limit, to a safe value, the short-circuit current flowing in its associated phase-conductor, it was necessary to make each coil of large size, thereby adding considerably to the cost of furnishing protection for the system. Again, the aforementioned arrangements of reactance coils required considerable floor space for their installation.

By means of my present invention, I superpose the coils upon one another and connect them in circuit in such manner that they are mutually inductively related. By superposing the coils as I propose, the total cost of the protective equipment of a distributing system is considerably reduced and, at the same time, the space required for installing the equipment is minimized.

In order to understand my invention more fully, reference may be had to the following description and the accompanying drawing in which Figure 1 is a view, partially in elevation and partially in section, of a three-phase reactance coil constructed in accordance with my invention; Fig. 2 is a plan view of the coil of Fig. 1; Fig. 3 is a diagrammatic view showing the direction of the instantaneous current flow in the three coil units comprising my reactance coil; Fig. 4 is a diagrammatic representation of a power-distributing system in which a reactance coil of my invention is connected in circuit, and Fig. 5 is a vector diagram illustrating the electromotive forces obtaining in the various sections embodied in my coil.

Referring to Figs. 1 and 2, a plurality of reactance-coil units 1, 2 and 3, each comprising a group of conductor spirals 4 (shown in Fig. 2), are superposed and spaced from one another substantially as shown in Fig. 1. Radially extending cleats 5 brace the conductor spirals against such external mechanical stresses as may be set up between the coil units and the superposed spirals when short-circuit or abnormally high currents flow in any portion of the coil. The cleats 5 also space the various convolutions or conductor turns from one another, thereby enhancing the ventilating properties of the coil. Longitudinally extending tie rods 8, projecting through openings in the extremities of the cleats 5, hold the coil units in fixed relation to one another and brace the spirals against longitudinal stresses.

Inasmuch as it is desirable for power-limiting reactance coils to offer as low reactance to the load currents as may be permissible and considerable reactance to short-circuit, or abnormally high, currents, it is usual to provide non-magnetizable cores for such coils. Cores of non-magnetizable material for imparting straight-line characteristics to the coils are, therefore, preferred. Under certain conditions, it might be economical to provide iron cores for reactance coils of high impedance, but, in the present instance, I prefer to use air cores and have shown my structure as being thus provided. Besides, air cores assist in ventilating the coils whereby the generated heat may be rapidly dissipated.

In the figures, the coil units are shown as formed of a single conductor, but when the currents are of sufficiently high value to preclude the use of a conductor of small diameter, I desire to employ a plurality of parallel-connected copper strands in preference to a conductor of large diameter because the former structure assists in ventilating the coil.

Since the electromotive forces impressed upon the phases of a polyphase system by reactance coils, under normal operating conditions, are small percentages only of the operating voltages, it is permissible, in most cases, to have the voltages impressed by the reactance coils slightly unequal and slightly displaced from the usual polyphase relationship. The inequality of the operating-phase voltages may be easily remedied by inserting induction regulators in the distributing mains, such as are extensively used. In my present reactance coil, the coil units may be so designed that the voltages impressed by them upon each of the phases are equal but slightly out of phase with the operating voltages, as mentioned above.

Referring to Figs. 3, 4 and 5, the top coil unit 1 is connected in series relationship with a power conductor 9, the intermediate coil unit 2 is connected in series relationship with a power conductor 10, and the bottom coil unit 3 is connected in series relationship with a power conductor 11. The arrows in Fig. 3 indicate the direction of the instantaneous current flow through each of the coil units 1, 2 and 3. It will be observed that the instantaneous flow of currents through the coils is in the same direction and, in consequence thereof, all of the coil units are similarly connected in circuit with their respective phase conductors. The coil unit 2, which is disposed intermediate the coil units 1 and 3 and is spaced predetermined distances from them, is, nevertheless, inductively related to them.

The coil unit 2 also comprises a greater number of convolutions or conductor turns than either of the coil units 1 and 3. Since the coil unit 2 is inductively related to the coil units 1 and 3 and is also provided with a greater number of conductor turns, it is evident that the mutual inductive effects of the coil units 1 and 3 upon the coil unit 2 are subtractive. In other words, electromotive forces induced in the coil unit 2 by the close inductive relation of the coil units 1 and 3 thereto subtract from the self-induced electromotive force of the coil unit 2.

The electromotive force in the coil unit 1 results from its self-inductance and the mutual inductance between it and the adjacently disposed coil unit 2. The action of the mutual inductance between the coil units 1 and 2 is such as to subtract from the self-inductance of the coil 1. Correspondingly, the electromotive force in the coil unit 3 is the resultant of its self-induced electromotive force and that resulting from the mutual inductance between it and the coil unit 2. The mutual induction between the coil units 2 and 3 results in an action, however, which subtracts from the self-inductance of the coil 3. Similarly, the resultant electromotive force of the coil unit 2, has, as its components, its self-induced electromotive force and the electromotive forces resulting from the mutual inductance between it and the coil units 1 and 3. The action arising from the inductive relation between the coil units 1 and 3 and the coil unit 2 is such as to subtract from the self-induced electromotive force of the coil unit 2. Since the coil units 1 and 3 are spaced a considerable distance from one another they are inductively related to a very slight degree only and, for practical purposes, this inductive relation may be considered as negligible.

In Fig. 5, vectors A, B and C represent, respectively, the self-induced electromotive forces in the coil units 1, 3 and 2. It will be noted that these vectors are spaced 120° from one another by reason of the three-phase currents obtaining in the coil units. Since the coil units 1 and 2 are inductively related to each other, an induced electromotive force, represented by a vector D, which is parallel to the vector C, is induced in the coil unit 1. Similarly, an electromotive force represented by a vector E, that is parallel to the vector A, is induced in the coil unit 2. Neglecting the inductive relation between the coil units 1 and 3, a vector F, which is the resultant of the vectors A and D, represents the resultant electromotive force obtaining in the coil unit 1.

By reason of the inductive relation between the coil units 2 and 3, an electromotive force represented by a vector G, that is parallel to the vector C, is induced in the coil unit 3 and, similarly, an electromotive force represented by a vector H, that is parallel to the vector B, is induced in the coil unit 2. The resultant electromotive force obtaining in the coil unit 3 is represented by a vector I which is equal in value to the vector F, since the coil units 1 and 3 comprise the same number of conductor turns and are equally spaced from the coil unit 2. The resultant electromotive force obtaining in the coil unit 2 is represented by a vector J that is the resultant of the vectors C, E and H.

Since the inductive relation between the coil units is such as to induce subtractive electromotive forces in them, the resultant electromotive forces obtaining in the coil units are less than their self-induced electromotive forces and, therefore, the vectors F, I and J are shorter than the vectors A, B and C, respectively.

The number of turns chosen for the coil unit 2 is such that the resultant electromotive force obtaining therein, namely, that represented by the vector J, is equal to the resultant electromotive forces obtaining in each of the coil units 1 and 3, namely, those represented by each of the vectors F and I. Although the resultant vectors are not disposed 120° from one another, as may be seen by inspection of Fig. 5, their unequal displacement is not of such a serious nature as to have any substantial effect upon the normal operating voltages impressed upon the conductors of the three-phase distributing system.

While I have herein shown and described an embodiment of my invention, it will be understood by those skilled in the art that various modifications may be made therein without departing from the spirit and scope of the appended claims.

I claim as my invention:

1. The combination with a plurality of conductors for polyphase currents, of a set of coil units which are superposed upon, and spaced from, one another, the end and intermediate coil units having unequal numbers of conductor turns and each of said conductors being connected in circuit with a single coil unit, the coil unit having the greater number of turns being disposed adjacent to the coil units having the smaller number of turns so as to be inductively related thereto.

2. The combination with a plurality of conductors for three-phase currents, of three coil units which are superposed upon, and spaced from, one another, the intermediate coil unit having a greater number of conductor turns than the two outer coil units and each of the said conductors being connected in circuit with a single coil unit, only the intermediate coil unit being inductively related to the two outer coil units.

3. The combination with a plurality of conductors for three-phase currents, of three coil units which are superposed upon, and spaced from, one another, the intermediate coil unit being inductively related to the two outer coil units in such a manner that their mutually inductive electromotive forces are subtractive with respect to the self-induced electromotive forces and each of the three said conductors being connected in circuit with a single coil unit only.

4. The combination with a plurality of conductors for three-phase currents, of three coil units superposed upon, and spaced from, one another, the intermediate coil unit having a greater number of turns than the two outer coil units, each of three of said conductors being connected in circuit with a single coil unit, the intermediate coil unit being connected in circuit in the same direction as the two outer coil units to which it is inductively related.

5. A three-phase reactance coil comprising three superposed and spaced coil units, the intermediate coil unit having a greater number of turns than the two outer coil units and adapted for being connected in circuit in the same direction as the two outer coil units.

6. A polyphase reactance coil comprising three superposed coil units, the two outer coil units having a smaller number of turns than the intermediate coil unit and said outer coil units and intermediate coil unit being inductively related to one another.

In testimony whereof, I have hereunto subscribed my name this 26th day of March 1917.

JOHN F. PETERS.